INVENTORS
RICHARD KILPERT
EDWARD J. WINSOR
RICHARD H. BAUER

ATTORNEY

United States Patent Office 3,425,455
Patented Feb. 4, 1969

3,425,455
SPRAYED INTERNALLY INSULATED PIPE
Richard Kilpert, Berkeley Heights, Edward J. Winsor, Fanwood, and Richard H. Bauer, West Caldwell, N.J., assignors to Esso Research and Engineering Company, a corporation of Delaware
Filed Aug. 30, 1965, Ser. No. 483,591
U.S. Cl. 138—143
Int. Cl. F16l 9/14, 9/16, 9/18
2 Claims

ABSTRACT OF THE DISCLOSURE

A pipe of carbon steel or similar low cost metal material is internally insulated with a sprayed plastic foam material. The interior isulation may be coated with an impervious epoxy plastic layer to produce a low cost metal conduit suitable for use at cryogenic temperatures.

---

Figure 1:
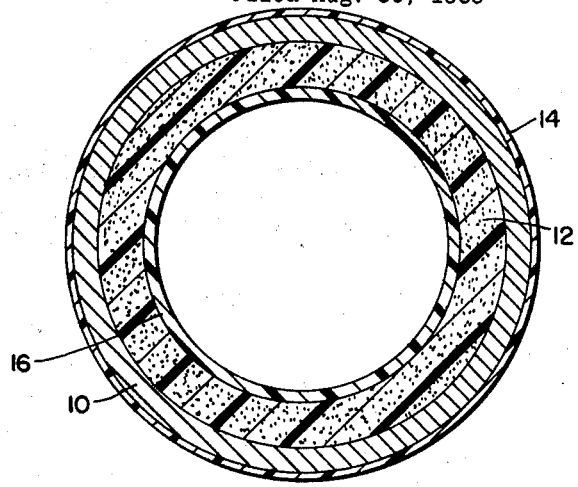

This invention relates in general to improvements in insulated pipes, and in particular to improvements in insulated pipe designed to carry fluids at cryogenic temperature. The present invention also relates to a novel internally insulated pipe and method of applying the insulation to the pipe interior.

In pipelines wherein it has been found desirable to apply an insulation system thereto for either maintaining the fluid traveling in the pipeline at an elevated temperature, or in the alternative maintaining a low temperature pipeline fluid at a low temperature, it has been customary to apply the insulation around the exterior of the pipe periphery. Such externally insulated pipeline systems must be protected from mechanical damage to prevent rupture of the insulation skin and subsequent moisture penetration during the construction and later operation of the pipeline. The present invention is concerned with an improved insulated pipe system wherein due to the application of the insulation to the interior of the pipe walls, the pipe conduit per se may then function as the protection system for the insulation and no exterior vapor barrier need be applied.

In addition, the application of the insulation to the pipe interior is effective to permit construction of a pipeline designed to operate at cryogenic temperatures of substantially reduced cost because the use of high cost nickel alloy steels or non-ferrous metals may be avoided. This is possible because the interior insulation, rather than the metal pipe, is exposed to the low temperature of the fluid passing therethrough which in one known application may be liquefied natural gas (LNG) at cryogenic temperature, which at atmospheric pressure is apuroximately —259° F. If a liquid at this low temperature were permitted to come into direct contact with a conventional carbon steel pipe, embrittlement due to cooling would occur in the carbon steel and fractures of the pipe would be inevitable. Applicants' novel internally insulated pipe, on the other hand, permits the use of ordinary carbon steels which result in a pipe section about ⅓ as costly as it would be if it were of a nickel steel with exteriorly applied insulation. A further cost advantage of applicants' invention is that the welded interconnections between adjacent pipe sections may be made much more economically on carbon steel in comparison to the greatly increased cost of welding sections of nickel steel pipe.

In the method of constructing the present invention, the insulation is preferably of a foamable plastic material such as polyurethane foam which is sprayed onto the interior of the pipe in a progressive lengthwise manner. The insulation is sprayed from the end of an elongated member or lance which extends inwardly from one end of the pipe through and slightly beyond the opposite end of the pipe. The foamable plastic insulation material leaves a plurality of lengthwise spaced spray nozzles at the end of the lance member and is deposited on the pipe interior to build up the desired insulation thickness. As either the elongated member is gradually withdrawn from the pipe, or in the alternative as the pipe is translated, the pipe may be rotated so that a smooth, uniform thickness insulation is applied about the entire pipe interior. Following the spray application of the foamable plastic from the leading set of nozzles, a second layer of plastic foam insulation may be applied to obtain the desired thickness. Thereafter, an impervious vapor barrier coating is applied to the insulation interior to create a vapor barrier to prevent penetration of the pipeline liquid into the insulation system.

Thus, the invention will be seen to provide a novel pipe wherein the most fragile of the pipe components; namely, the insulation, is protected from damage by the primary pipe structure. This optimized arrangement of insulation and pipe conduit thus places the insulation into intimate contact with the least harsh of the operating environments rather than the most harsh of the operating environments as is the case when the insulation is exterior on the pipe conduit.

Accordingly, it is the principal object of this invention to provide an improved internally insulated pipe and method for making such pipe.

Another object of the invention is to provide an improved insulated pipe of substantially less cost than prior pipes capable of transporting liquids at cryogenic temperature.

Another object of the invention is to provide an improved insulated pipe structure having an inert interior surface highly resistant to corrosive attack.

A still further object of the invention is to provide an insulated pipe structure which is simple in design, extremely rugged in construction, and economical to manufacture.

Figure 2:
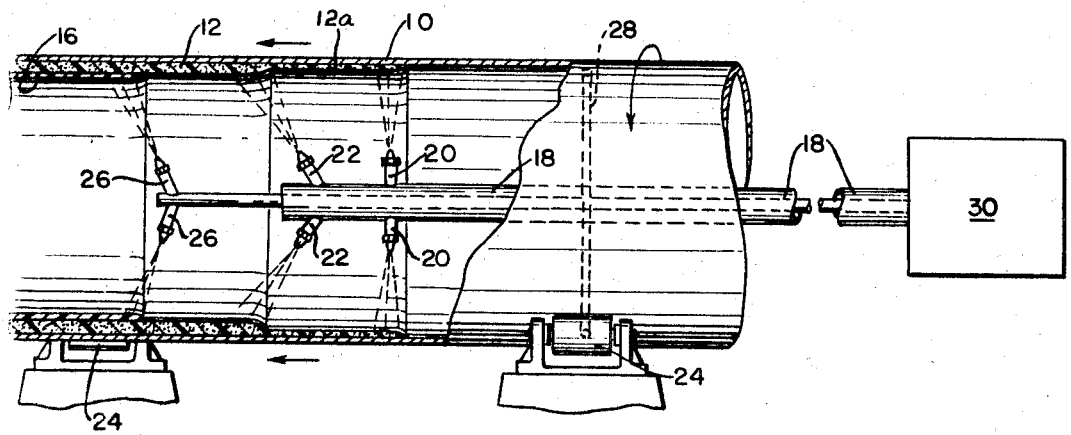

These and other objects and advantages of the invention will become apparent and the invention will be fully understood from the following description and drawings in which:

FIG. 1 is a cross-sectional view of an insulated pipe in accordance with the invention; and FIG. 2 is a horizontal view of the pipe showing portions in section during the manufacture thereof.

Referring to the drawings in particular, a pipe or conduit 10, preferably made of any conventional carbon or mild steel, is provided with an internal layer of insulation 12 which is preferably of a sprayed on and subsequently foamed polyurethane plastic or similar material. The inner surface of the insulation 12 is protected and sealed by a moisture barrier impervious coating 16 which is preferably of an inert epoxy resin. The exterior of the pipe 10 is provided with a conventional external corrosion protection coating 14 which may be a Bitumastic and kraft paper wrap or other alternate means.

Referring specifically to FIG. 2, the method by which applicants' novel pipe is produced may be readily understood. In FIG. 2, the pipe section 10 is supported by a plurality of rotating conveyor support rollers 24. These rollers may have their rotational axes extending parallel to the axis of the pipe and thereby impart pure rotational movement to the pipe, or in the alternative, their axes may be slightly skewed in conventional fashion so that axial translation of the pipe occurs as it is rotated. An elongated boom or lance 18 extends inwardly from one end of the pipe section along its entire length to the other end of the pipe section desired to be insulated. The boom 18 includes at its far end a plurality of first spray nozzles 20, second spray nozzles 22, and third spray nozzles 26.

In operation the materials desired to be applied to the interior of the pipe are discharged from a spray supply means shown schematically at 30 and are carried through suitable co-axial conduits along the length of the boom 18 to their respective spray nozzles. As the elongated boom 18 is withdrawn from the pipe, or the pipe section moved off the boom, the first spray nozzle 20 is effected to apply a preliminary sprayed coating 12a of polyurethane plastic foam. The insulation layer 12a first deposited from nozzle 20 is subsequently covered by a similar insulation layer applied by nozzle 22. Shortly thereafter, as progressive translation occurs between the boom 18 and the pipe 10, a final moisture barrier coating, preferably of epoxy resin, is sprayed from nozzle 26 onto the interior surface of the foam insulation 12. Depending upon the required length of the boom 18 to apply the insulation to different length conduits, one or more pipe centering and supporting means shown generally at 28 may be employed. These pipe support means 28 may be of any conventional type and operate to limit any eccentricity between the pipes' inside diameter and the boom 18.

While a specific embodiment of the invention has been shown and described in detail to illustrate the application of the inventive principles, it will be understood that the invention may be embodied otherwise without departing from such principles.

What is claimed is:

1. An internally insulated pipe for use at cryogenic temperature comprising, an outer metallic pipe member of carbon steel, a tubular sleeve of insulation material securely bonded to the interior walls of said pipe member and being formed by at least one spray application of a foamable plastic insulation material such as polyurethane foam, and an impervious epoxy material coating on the interior surface of said tubular sleeve whereby the low cryogenic temperature of a fluid flowing in the pipe interior is effectively isolated from said carbon steel pipe member and low temperature embrittlement thereof is prevented.

2. An insulated pipe in accordance with claim 1 including a Bitumastic and kraft paper coating bonded to the exterior of said metallic pipe member for preventing corrosion thereof.

References Cited

UNITED STATES PATENTS

| | | | |
|---|---|---|---|
| 402,563 | 5/1889 | Colgate | 138—145 X |
| 564,174 | 7/1896 | Elwell | 138—143 |
| 724,892 | 4/1903 | Langford | 138—146 |
| 1,593,702 | 7/1926 | Moore et al. | |
| 1,697,086 | 1/1929 | Pryce | 138—143 |
| 2,348,477 | 5/1944 | Jenkins | 138—145 |
| 2,360,067 | 10/1944 | McLeish | 138—149 X |
| 2,419,278 | 4/1947 | Matsenbocker | 138—149 X |
| 2,596,490 | 5/1952 | Jenkins | 138—146 |
| 2,623,809 | 12/1952 | Myers | 138—145 X |
| 2,794,448 | 6/1957 | Marantz | 138—145 |
| 3,007,203 | 11/1961 | Ammons | 138—146 X |
| 3,008,493 | 11/1961 | Roe | 138—146 |
| 3,084,088 | 4/1963 | Hunkeler | 138—148 X |
| 3,087,515 | 4/1963 | Venable et al. | 138—145 |
| 3,177,902 | 4/1965 | Rubenstein | 138—145 X |
| 3,307,590 | 3/1967 | Carlson | 138—49 |

HOUSTON S. BELL, JR., *Primary Examiner.*

NELSON C. CUDDEBACK, *Assistant Examiner.*

U.S. Cl. X.R.

138—146, 149